United States Patent

[11] 3,572,916

[72] Inventor John P. Belton, Jr.
 Baltimore, Md.
[21] Appl. No. 801,055
[22] Filed Feb. 20, 1969
[45] Patented Mar. 30, 1971
[73] Assignee The United States of America as represented by the Secretary of the Navy

[54] SOUND SYNCHRONIZATION WITH A PROJECTED IMAGE
 2 Claims, 1 Drawing Fig.
[52] U.S. Cl................................................ 352/11, 352/39
[51] Int. Cl............................................ G03b 21/32
[50] Field of Search.................................. 352/11, 39

[56] References Cited
 UNITED STATES PATENTS
 1,855,149 4/1932 Jones............................ (352/11UX)
 2,406,574 8/1946 Waller et al. ................ 35/25

FOREIGN PATENTS
258,864 12/1927 Great Britain................ 352/11

Primary Examiner—Louis R. Prince
Assistant Examiner—Frederick Shoon
Attorneys—Joseph C. Warfield, John W. Pease and Harvey A. David ABSTRACT: A binaural or stereo sound system for use with a dirigible projection system having a single sound track, the sound system including a plurality of speakers and corresponding power amplifiers, a preamplifier for amplifying signals from the sound track pickup, and a distribution means comprising ganged potentiometers receiving the preamplifier output and having wipers positioned with the dirigible projection system. The potentiometer wipers are connected to respective ones of the power amplifiers whereby the speakers provide a stereo sound reproduction corresponding to the position of a projected image.

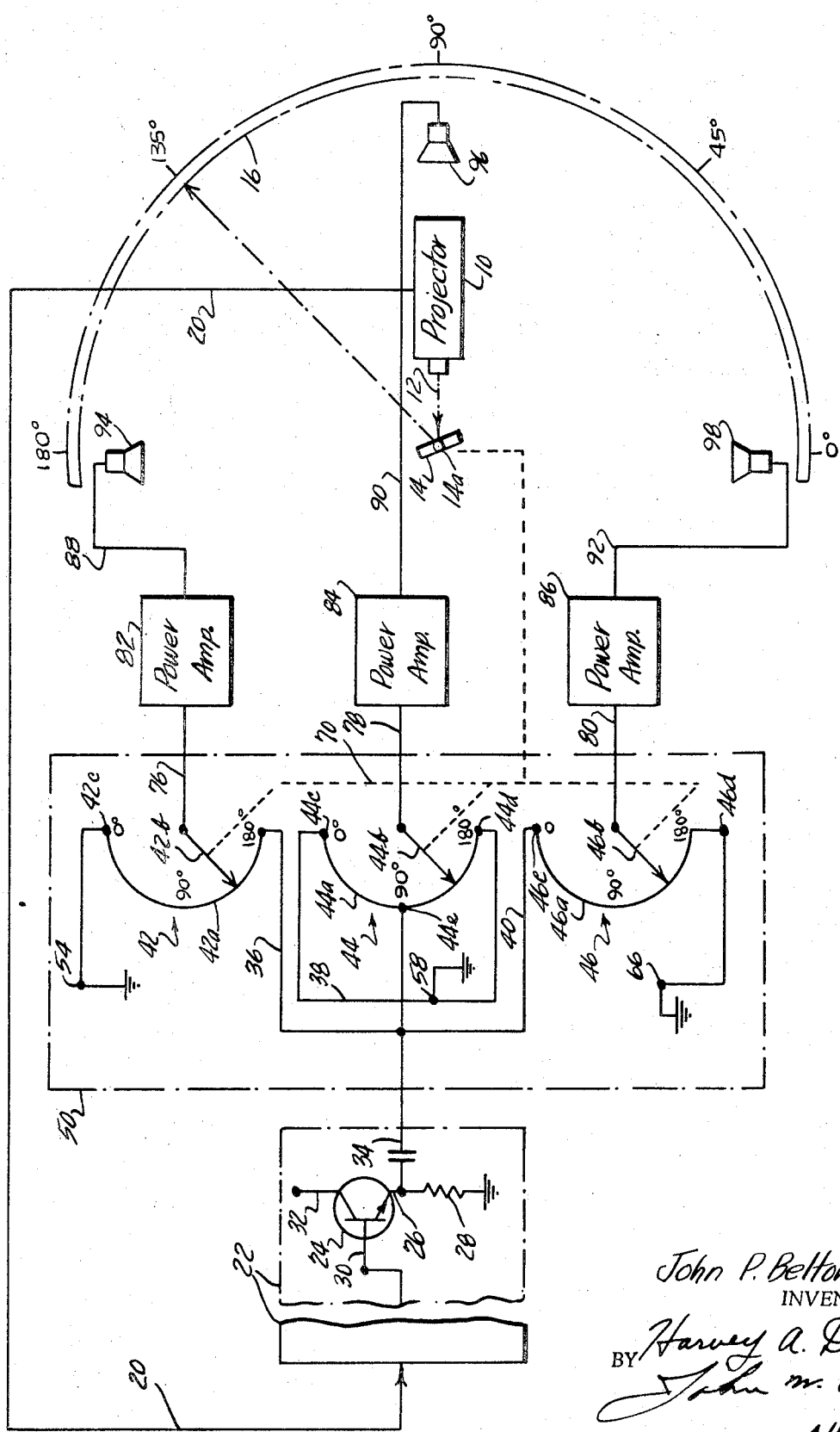

SOUND SYNCHRONIZATION WITH A PROJECTED IMAGE

BACKGROUND OF THE INVENTION

This invention relates to training devices and more particularly to a stereo sound reproduction system for use in conjunction with projection apparatus for training personnel in the aiming of a shoulder held antiaircraft weapon. The types of weapon concerned are those which are effective against low flying aircraft. Proper aiming of the weapon requires practice in target acquisition and tracking, which skills involve estimating proper lead and anticipation of the trajectory which the aircraft will follow. Because the procedures involved in readying and firing such a weapon are time dependent, that is to say each procedure must be done in a given sequence and within time limits established for example by the short effective life of a thermal battery element, adequate familiarization training is important. With respect to one typical weapon, the trainee must learn how to judge when to activate the weapon circuits, to position the target in the sight reticle very quickly, uncage a gyro and wait for it to stabilize, quickly introduce superelevation and lead angles, squeeze the trigger at the appropriate moment, and hold steady on the target point for a predetermined minimum time after firing.

Proficiency training consists of providing the trainee with the opportunity to develop and exercise skill in operating the device. The trainee must learn to take advantage of the available cues in his environment and to anticipate the effect of different factors on the effectiveness of his operation. For example, the operator might hear an enemy aircraft before he sees the target. By taking advantage of this forewarning, he can prepare himself and his weapon for the moment when he does see it. With proper training the operator can learn to anticipate target course and to determine the possibility of obstructions such as trees or hills interfering with his launch. Taking such factors into account and properly responding to them can only be taught by practicing in a highly realistic and varied environment. Therefore, it is essential that dynamic aural as well as visual and IR (infrared) target characteristics are available for practice in a number of different tactical settings.

BRIEF SUMMARY OF THE INVENTION

With the foregoing in mind, it is a principal object of this invention to provide, for use in simulation or training apparatus which provides a projected image of a low flying aircraft, a novel sound representation of a target aircraft, synchronized with the image trajectory whereby a trainee may learn to be aurally alerted to the approach of a low flying aircraft before visual detection thereof. The trainee also derives aural cues as to the direction of target travel and range of the target. The sonic representation feature provides the apparatus with a high degree of realism which reinforces the learning process.

Another object of this invention is the provision of a stereo sound reproduction system wherein the sound is reproduced from a plurality of speakers in coordination with the azimuth position of a projected image, and which system requires only a single sound recording such a single magnetic stripe on the edge of a motion picture film.

These and other objects and advantages of simulation apparatus embodying the present invention will become apparent from the following detailed description when read in conjunction with the accompanying drawing forming a part of this specification.

IN THE DRAWING

The sole FIGURE is a diagrammatic illustration of a stereo sound reproduction system embodying the invention and shown in association with portions of a target image projection apparatus.

DESCRIPTION OF THE PREFERRED EMBODIMENT

In the form of the invention illustrated in the drawing and described hereinafter, there is provided a stereo or binaural sound system which provides audio outputs for a plurality of separate channels from a single recording stripe or track on a motion picture film.

Suffice it to say here, that the projection system includes a motion picture film projector 10 having at least a single sound track reading or pickup capability. The projector 10 provides a visual target image-forming beam 12 which is reflected by a beam directing means in the form of a gimballed mirror 14 onto a curved projection screen 16 The gimballed mirror 14 is positionable in azimuth and elevation to cause the target image to follow a programmed trajectory in a manner described in the aforementioned copending application. In the present example, the screen 16 subtends approximately 180° of azimuth. In use a trainee or other viewer is positioned in the vicinity of the center of curvature of the screen 16.

In order to provide realistic target simulation it is necessary to provide a stereo or binaural sound of the aircraft being simulated as a target, with the direction from which the sound comes to a trainee being coordinated with the azimuthal position of the target image. To this end, and in accordance with the invention, the output signals from the projector soundtrack pickup are applied as shown by flow line 20 as an input to an audio signal preamplifier 22. At this point it should be mentioned that the sound-track recording is conveniently recorded with range attenuation corresponding to the slant range of the simulated target.

The preamplifier 22 may be of any conventional construction but is conveniently of the transistor amplifier type. In the drawing only the last stage transistor 24 is shown, this transistor being an NPN type connected in common collector configuration. Thus, the emitter 26 is connected through an emitter bias resistor 28 to ground, the signal from the preceding stage is applied to the base connection 30, and the output is taken from the emitter connection 26 via conductor 34.

The output of the preamplifier 22 is applied via conductors 34, 36, and 40 to potentiometers 42, 44, and 46, respectively of an audio signal distributing means 50 by which the output of the preamplifier is separated into a plurality of audio channels in a manner which will become apparent as this specification proceeds.

The potentiometer 42 comprises a resistive element 42a, a wiper 42b, and taps or electrical connections 42c, 42d, at or near the ends of the resistive element. The potentiometer 44 comprises a resistive element 44a, a wiper 44b, end taps 44c, 44d, and a center tap 44e. The potentiometer 46 comprises a resistive element 46a, a wiper 46b, and end taps 46c, 46d. The conductors 36 and 40 are connected to the taps 42d and 46c, respectively, while the conductor 34 is connected to the tap 44e.

The tap 42c is connected to a terminal 54 representing ground potential. Similarly, the taps 44c and 44d are connected to a terminal 58 representing ground, and the tap 46d is connected to a terminal 66 representing ground.

The wipers 42b, 44b, and 46b are mechanically ganged as indicated by dotted line 70, and are mechanically connected, as shown by the dotted line 72, to the vertical axis 14a of the gimballed mirror 14. The mechanical connection 72 is such that there is a 1:2 ratio between movements of the mirror 14 in azimuth and the movements of the wipers along their respective resistive elements. This is to account for the fact that each degree of azimuthal movement of the mirror 14 results in 2° of deflection of the target image forming beam 12, and hence of the target image.

The wipers 42b, 44b, and 46b are connected as shown by lines 76, 78, and 80 to the inputs of power amplifiers 82, 84, and 86, respectively. The outputs of these power amplifiers are connected as indicated by lines 88, 90, and 92 to loudspeakers 94, 96, and 98, respectively. These loudspeakers are disposed at 0°, 90°, and 180° positions with respect to the screen 16.

In the operation of the system the wipers 42b, 44b, and 46b are positioned along their respective resistive elements in accordance with the azimuthal position of the mirror 14 and hence of the projected target image. Accordingly, when the mirror 14 is positioned to provide a target image at the 180° end of the screen 16, the wiper 42b will pick off a portion of the preamplifier output at a relatively high voltage and the volume or intensity of the sound from the speaker 94 will be at a maximum for the particular audio input to the preamplifier. Also with the mirror so positioned, the wipers 44b and 44c will be positioned to operate the speakers 96 and 98 at a minimum volume level.

Movement of the mirror 14 to bring the target image toward the 90° position will cause the wipers 42b, 44b, and 46b to move correspondingly so that the volume of speaker 94 will decrease and the volumes of speakers 96 and 98 will increase each at such a rate that the 90° position the volume from the center speaker will be a maximum and the volume from each of the speakers 94, 98 will be at a suitable intermediate volume.

Movement of the mirror 14 to bring the target image from the 90° screen position toward the 0° position will be accompanied by movement of the wipers 42b, 44b, and 46b to effect changes in the speaker volumes until at the 0° position the speakers 94, 96 are operating at minimum and the speaker 98 is operating at maximum volume.

The net result is a realistic stereo or binaural audio effect on the trainee, thereby lending realism to a training situation but without requiring a separate sound track and preamplifier for each audio channel.

In some applications the invention may be practiced to advantage without the intermediate channel represented by potentiometer 44, amplifier 84, and speaker 96.

I claim:

1. In a target simulating projection system including a projector for providing a visible image forming projection beam and having at least a single sound-track pickup capability, a projection screen, and beam directing means positionable to cause a target image to traverse said screen, a stereo sound system for producing from a single sound track sound effects coordinated with the position of said image on said screen, said sound system comprising:

a preamplifier connected to receive as an input audio signals from the pickup of said projector, said preamplifier being operative to provide amplified audio signals as an output;

a plurality of audio power amplifiers;

a plurality of loudspeakers each connected in driven relation to one of said power amplifiers;

an audio signal distributor means connected to receive the output of said preamplifier, said distributor means being connected to said beam directing means and responsive to the position thereof to provide a plurality of separate outputs one to each of said power amplifiers, whereby each of said speakers reproduces sound correlated in intensity to the position of said target image on said screen; and said audio signal distributor means comprising a plurality of potentiometers, each of said potentiometers having a resistive element coupled to the output of said preamplifier, each of said potentiometers having a wiper connected to the input of one of said power amplifiers, and said wipers being connected for ganged operation in response to movement of said beam directing means.

2. A sound system as defined in claim 1, and wherein:

said screen is curved and subtends an obtuse angle;

said speakers comprise first, second, and third speakers, distributed along said screen, with said first speaker adjacent one end of said screen, said third speaker adjacent the other end of said screen, and said second speaker adjacent the center of said screen;

said power amplifiers comprise first, second, and third power amplifiers having their outputs connected respectively to said first, second, and third speakers; and said potentiometers comprise a first potentiometer operative to provide progressive change in intensity of operation of said first speaker from a maximum to a minimum as said beam directing means causes said image to travel from said one end of said screen to the other end thereof, a second potentiometer operative to provide progressive change in intensity of operation of said third speaker from a minimum to a maximum as said beam directing means causes said image to travel from said one end of said screen to the other, and a third potentiometer operative to provide a progressive increase in intensity of operation of said second speaker from a minimum to a maximum as said image travels from said one end to said center of said screen, said third potentiometer also being operative to provide a progressive decrease in intensity of operation of said second speaker as said image travels from said center screen to said other end thereof.